J. W. BROWN, Jr.
VALVE MECHANISM.
APPLICATION FILED NOV. 12, 1913.

1,126,381.

Patented Jan. 26, 1915.
5 SHEETS—SHEET 5.

Witnesses—
Charles H. York.
Willet Burrows

Inventor—
John Wilson Brown Jr.
by his Attorneys—
Howson & Howson

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

VALVE MECHANISM.

1,126,381.      Specification of Letters Patent.      Patented Jan. 26, 1915.

Application filed November 12, 1913. Serial No. 800,609.

*To all whom it may concern:*

Be it known that I, JOHN W. BROWN, Jr., a citizen of the United States, residing in Philadelphia, Pennsylvania, have invented certain Improvements in Valve Mechanism, of which the following is a specification.

One object of my invention is to provide a relatively simple, compact and substantial valve mechanism including a conveniently adjustable member, operable either by hand to admit fluid under pressure to or exhaust it from a power cylinder, or when properly set, capable of being automatically actuated to perform the same functions.

I further desire to provide a novel form of movable valve member capable of acting to wire-draw the flow of fluid under pressure, until the valve is in its full opened position.

Figure 1:
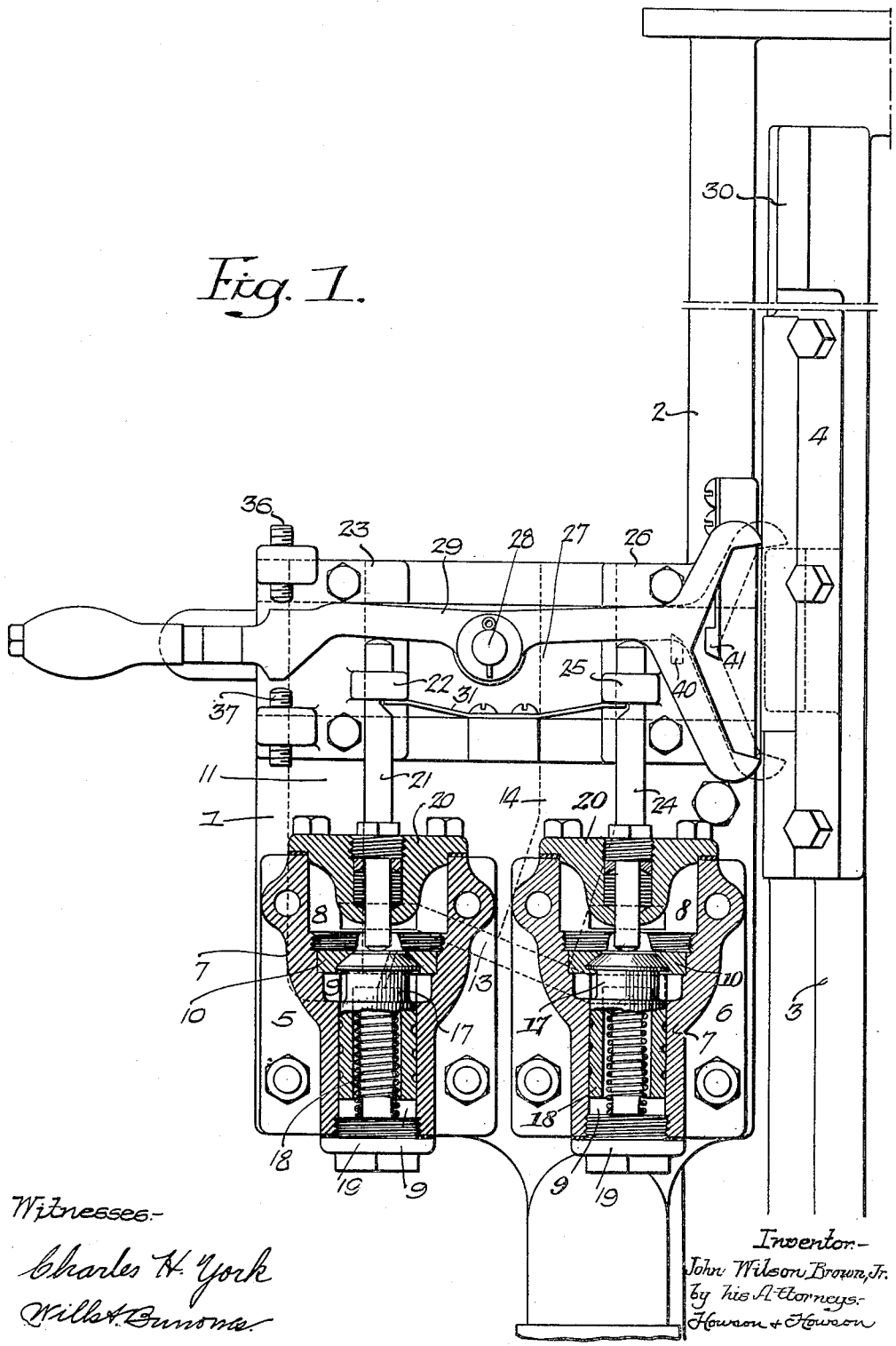
Figure 2:
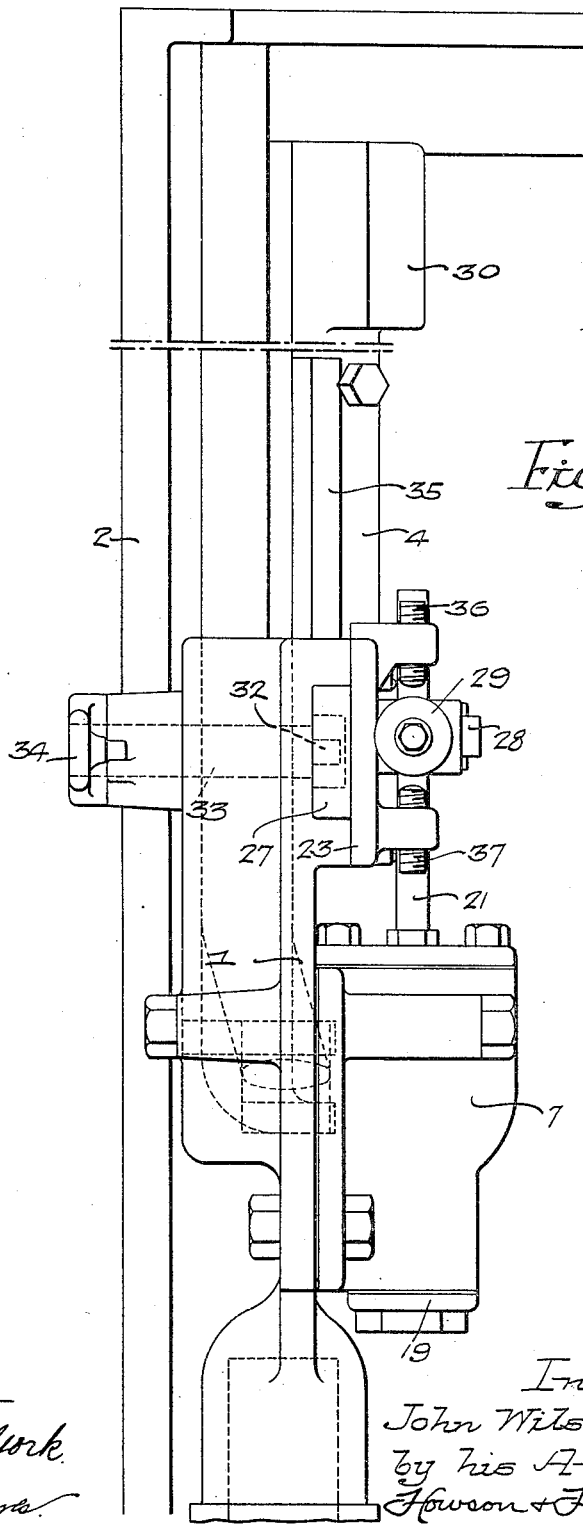
Figure 3:
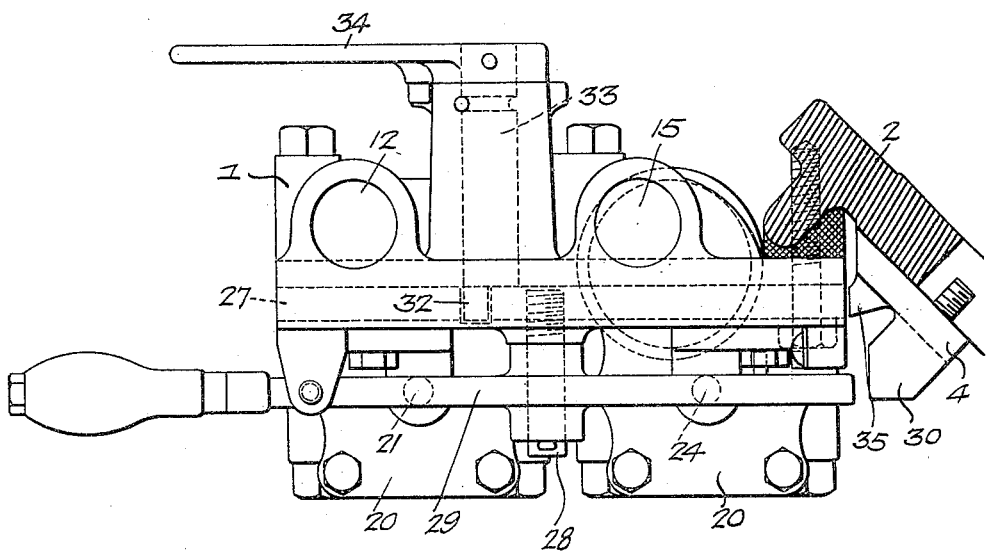
Figure 4:
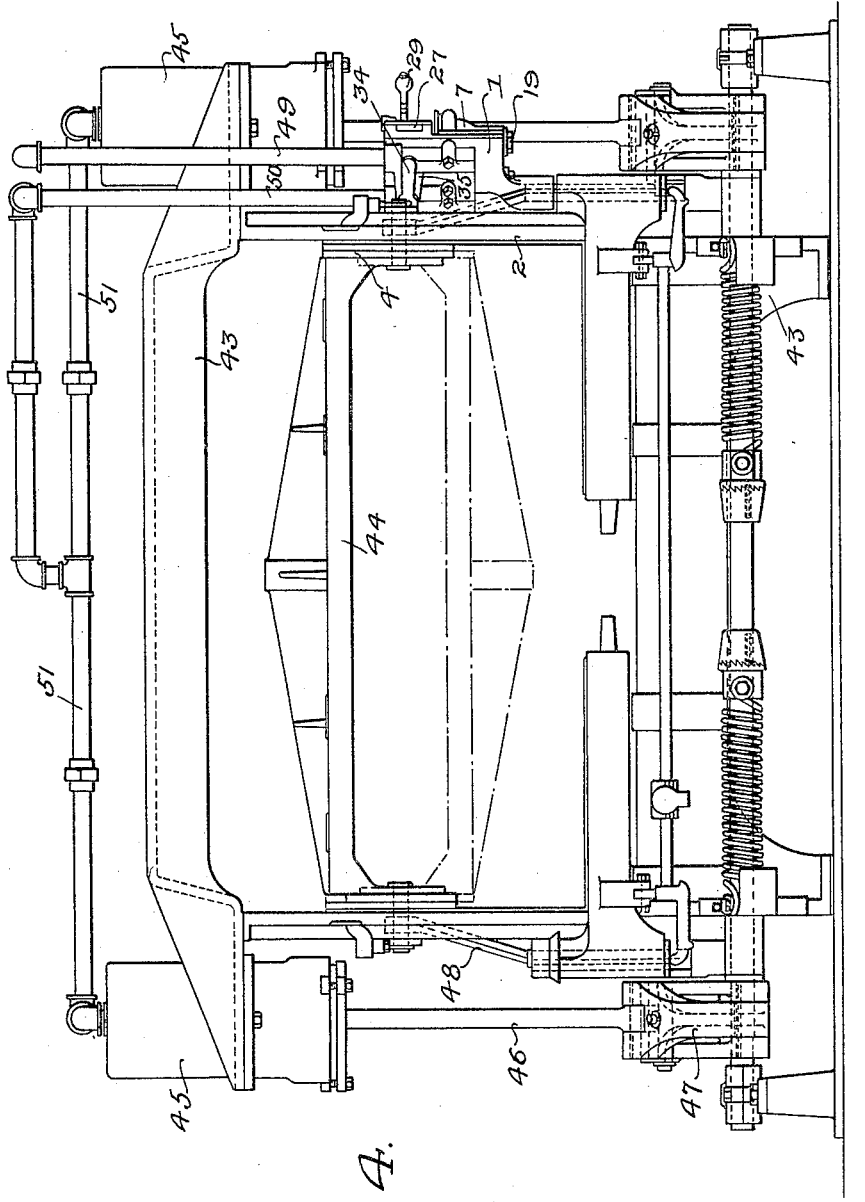
Figure 5:
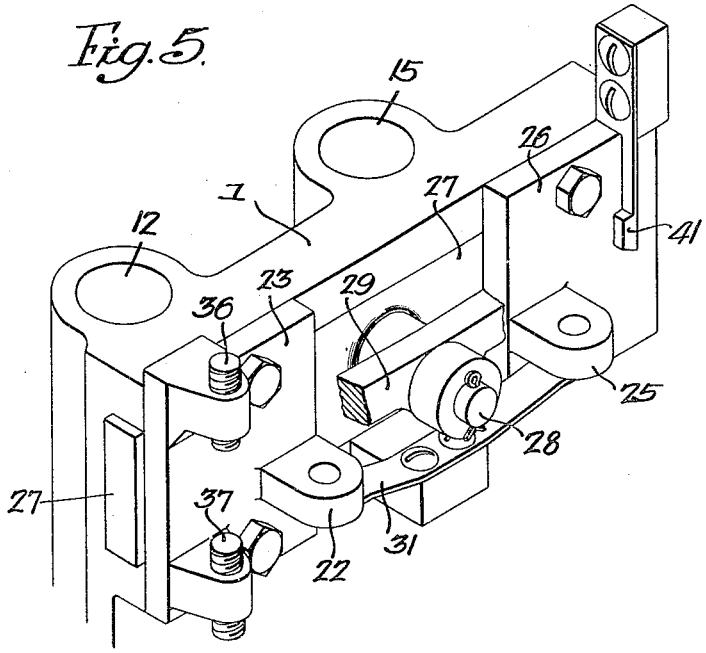
Figure 6:
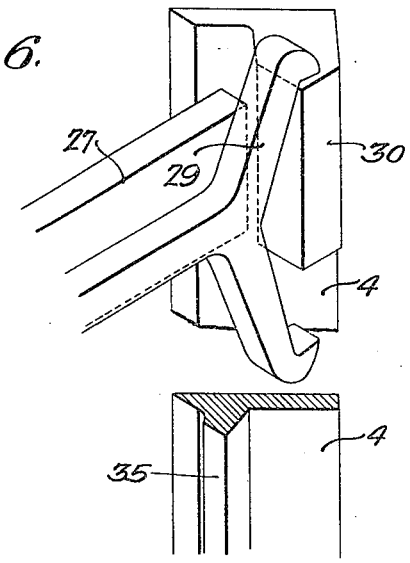

These objects and other advantageous ends I secure in the following manner, reference being had to the accompanying drawings, in which:

Figure 1 is a front elevation, partly in section, of a combination of parts embodying my invention; Fig. 2 is a side elevation of the mechanism shown in Fig. 1, Fig. 3 is a plan, partly in section, further illustrating the invention, and Fig. 4 is a front elevation of a molding machine with which my invention may be used. Figs. 5 and 6 are perspective views illustrating in detail the relative arrangement of certain features of the invention.

In the above drawings, 1 is a supporting plate, in the present instance, fixed to a vertical standard 2 provided with a guideway on which is mounted a reciprocable cross-head of which a part is illustrated at 4; it being understood that in the present case said cross-head is attached to or forms part of the reversible table of a molding machine such as that shown in Fig. 4. In said machine 43 represents a suitable open frame on which is slidably guided the reversible table 44 above referred to. This table is moved in the frame by power delivered from a pair of engines or motors whose cylinders 45 are carried by the frame and whose pistons are operatively connected to said table through connecting rods 46, cranks 47 and connecting rods 48. Motive fluid under pressure is delivered to the controlling valve for said engines or motors through a supply pipe 49 connected to an inlet opening 12 of said valve, and from a second opening 15 passes through a pipe 50 and two branches 51 to the cylinders 45. At one side of the machine in a position convenient for an operator is fixed a plate 1, and it is to be noted that the detail features of the machine shown in Fig. 4 are described and claimed in an application for United States Patent filed by me November 12, 1913, Serial No. 800,608.

Mounted on the plate 1 is an inlet valve 5 and an exhaust valve 6 of substantially identical construction, and each valve consists of a casing 7 divided into upper and lower chambers 8 and 9 by a partition 10 having therethrough an opening whose walls constitute a conical valve seat as shown in Fig. 1. The chamber 9 of the inlet valve has opening into it a passage 11 to whose entrance 12 is connected a pipe (not shown) leading from a source of fluid under pressure. A second passage 13 connects the chamber 8 of the inlet valve 5 with the chamber 9 of the exhaust valve 6, and this passage in turn is connected to the cylinder or cylinders to be supplied with motive fluid through a passage 14 having an outlet opening 15. The chamber 8 of the exhaust valve 6 is connected by a passage 16 to an exhaust pipe (not shown), or in some cases it may exhaust directly into the atmosphere.

Mounted within the chamber of each of the casings 7 is the valve proper 17 having a conical portion coacting with the conical walls of the passage through the partition 10 and preferably made tubular for a portion of its length to receive a spring 18 which is held in place by a movable plug or cap 19 closing the lower end of the chamber 9. It is to be noted that the passage through the partition 10 preferably has a conical portion connected at its base to a second slightly conical part so that is is necessary for the conical head of the valve 17 to be moved completely out of the passage through the valve seat before a full opening of the valve can take place. The chamber 8 of each valve has a cover or bonnet 20 removably held in place by bolts and provided with a passage for a valve operating rod 21 whose upper end is guided in a bearing provided by a lug 22 formed as part of a plate 23. The exhaust valve similarly has an operating rod 24 guided in a bearing provided by a lug 25 mounted on a plate 26. These two plates 23 and 26 are bolted or otherwise removably held to the main supporting plate 1 in such positions as to serve as retaining means for a longitudinally movable slide 27 guided in a suitable cavity of said main plate and carrying a spindle or pivot 28 on which is mounted a valve operating handle 29. The latter extends in both directions from its supporting pivot 28 and one end projects beyond the edge of the plate 1 so as to be readily grasped by an operator, while its opposite end is branched or forked so as to be capable of extending both above and below a tappet 30 carried by or forming part of the cross-head 4, when said tappet is properly positioned. The part of the handle 29 between the pivot 28 and its forked end extends immediately over and is normally in contact with the upper end of the exhaust valve rod 24, while the part of said handle between the pivot and its opposite end similarly extends over and engages the upper end of the inlet valve rod 21, both of said rods being normally maintained in their upper positions by the ends of a spring 31 carried by the suitable projecting part of the supporting plate 1.

From Figs. 2 and 3 it will be seen that the slide 27 is engaged by a pin 32 eccentrically set in or connected to a spindle 33 rotatably mounted in a bearing projecting from the rear face of the supporting plate 1; there being fixed to the outer end of this spindle an operating handle 34, whereby, when desired, it and the pin 32 may be turned through an angle of 180° so as to cause the slide 27 to be projected toward the cross-head 4. This latter, below the tappet 30 is provided with a vertically extending rib 35, which when said tappet is not in position to permit of its being embraced by the branches of the forked end of the handle 29, extends in front of the end of said slide so as to prevent its being moved longitudinally.

On the plate 23 I preferably mount a pair of limit screws 36 and 37 whereby excessive upward and downward movement of the handle 29 is prevented, and it will be noted that when said handle is in the position shown in Fig. 1 the portion thereof between said screws is swelled or laterally extended so that these latter will permit of but a relatively small angular movement of the handle on its pivot pin 28. When, however, the slide 27 has been so adjusted as to project the branched end of the handle, then a relatively narrow portion of the latter is brought between the limit screws 36 and 37 so that a relatively larger angular movement of said handle is possible.

In order to retain the handle 29 in a position in which it holds the exhaust valve open, I provide it with a projecting lug 40 having an inclined upper face, designed to co-act with the correspondingly inclined lower face of a spring catch 41 mounted on the plate 1. With this arrangement although said catch will hold the forked end of the handle in a depressed position after said lug has once been placed under it, a predetermined upward pressure on said end will cause the spring strip supporting said catch to yield and move to one side allowing said handle to turn on its pivot.

Under operating conditions, with the parts in positions shown in Fig. 1, a downward movement of the projecting end of the handle 29 causes the movable member 17 of the inlet valve to be forced off of its seat, although owing to the construction of the latter and to the adjustment of the limit screws 36 and 37 there is not a full flow of motive fluid through said seat. The compressed air or other motive fluid is then free to flow through the passage 11 into the chamber 9, thence through the valve seat into the chamber 8 to the inlet valve, into the passage 13 and 14 and so to the cylinder or cylinders connected to the latter. Upon release of the downward pressure on the end of the handle 29, the valve member 17 is immediately moved to its closed position under the action of the spring 18, and said handle is returned to its neutral position in which both valves are closed. When the projecting end of the handle is raised, the exhaust valve 6 has its movable member similarly opened so that the motive fluid is allowed to flow from the cylinder or cylinders through the passages 14 and 13, past the movable valve member 17 and thence out through the exhaust pipe connected to the port or passage 16. As the motive fluid is alternately admitted to and exhausted from the cylinder or cylinders connected to the valve, the cross-head 4 is reciprocated on the guideways of which one is shown at 2, as is also the structure or mechanism connected to said cross-head. As long as the rib 35 is opposite or immediately adjacent the end of the slide 27, this cannot be moved from the position shown. When, however, it is desired that the valves shall be automatically actuated by the cross-head 4, this latter is moved by any suitable means, such as, for example, the engine attached thereto, until the tappet 30 occupies the position shown in dotted lines in Fig. 1. Under these conditions the slide adjusting handle 34 may be turned through 180°, thus rotating the spindle 33 and causing the eccentric pin 32 to project the slide 27 and with it the forked end of the handle 29 so that the two branches thereof project respectively above and below the opposite ends of said tappet 30. If now the operator's end of the handle 29 be moved down to open the inlet valve, motive fluid is admitted to the cylinder or cylinders connected to said valve, it being noted that the latter is free to be moved to its full open position so that the cylinder or cylinders are operated at their maximum capacity. If it be assumed that as a result of the movement of the piston belonging to said cylinder or cylinders, the tappet 30 moves down, then after suitable movement of the structure or apparatus connected to said piston, said tappet will engage the lower branch of the forked end of said handle, forcibly moving it down. As a result said handle first permits closure of the inlet valve, thereafter causes the exhaust valve to open and is finally latched in a position in which said exhaust valve is held open by reason of the lug 40 on said handle being forced and held under the inclined end of the spring catch 41. By reason of this opening of the exhaust valve the mechanism attached to the cross-head is caused to reverse its direction of movement, so that the tappet 30 moves upwardly and finally engages the upper branch of the forked end of the handle, first forcibly causing the spring catch 41 to move to one side as said handle is turned on its pivot and thus permitting the exhaust valve 6 to close. Thereafter the inlet valve 5 is opened, thus again admitting motive fluid to the cylinder or cylinders and causing the direction of movement of the mechanism actuated thereby to be reversed. As a result of this reversal of movement, the handle 29 very shortly returns to its neutral position in which the inlet valve 5 is closed, but the motive fluid already admitted to the cylinder continues to act by expansion so that the piston is caused to complete its stroke and the tappet 30 is again brought into engagement with the lower branch of the forked end of the operating handle with the results previously noted. At any time the adjusting handle 34 may be returned to the position shown in Fig. 3 thus freeing the operating handle 29 from the automatic action of the tappet, whereupon the engine connected to the valve may be manually controlled as before indicated.

With the above described valve mechanism it is possible to subject the table 44 to a rapid jarring in order to compact the sand in flasks carried upon it and also to employ it to exert a steady pressure upon the sand or flasks therein when this may be desirable.

I claim:—

1. The combination of a valve; a handle for manually actuating the same; a moving member; and means for adjusting the handle into either of two positions, in one of which it is automatically actuated by said moving member to operate said valve and in the other position it is unaffected by said member.

2. The combination of an inlet and an exhaust valve; a handle for manually operating said valves; a reciprocable member; and means for moving the handle into position to cause it to be automatically actuated by said reciprocable member to operate said valves.

3. The combination of a valve; a supporting structure; a slide movably mounted on said structure; a manually operative handle mounted on the slide in position to actuate the valve; a moving member; and means for adjusting the slide to bring the handle into or out of a position in which it is automatically actuated by said moving member to operate the valve.

4. The combination of a valve; a handle for manually actuating said valve; a moving member having a tappet; and means operative at will for causing said handle to be automatically actuated by the tappet.

5. The combination of a valve; a handle for manually actuating the same and provided with two abutments; a movable member; and means for adjusting the handle into position to cause the abutments to be alternately engaged by the moving member.

6. The combination of a valve; a handle for manually actuating the same having two abutments; a reciprocable member having a tappet; and means for adjusting the handle to bring the abutments within the path of the movement of the tappet to cause said handle and valve to be automatically actuated.

7. The combination of a valve; a handle for manually actuating the same having two abutments; a reciprocable member having a tappet; means for adjusting the handle to bring the abutments within the path of the movement of the tappet to cause said handle and valve to be automatically actuated; with means for preventing adjustment of the handle except when the tappet is in an operative position.

8. The combination of a valve; an adjustable slide; a handle mounted on the slide in position to actuate the valve and provided with a forked portion; a reciprocating member having a tappet; means for moving the slide to bring the branches of the forked portion into the path of movement of the tappet; and a projection on the reciprocable member placed to prevent movement of the slide except when the tappet is in position to allow the branches of the handle to extend on either side of it.

9. The combination of a supporting structure having a guide-way; a slide longitudinally movable therein; a plurality of valves having stems; a handle pivotally mounted on the slide in position to actuate the valves through said stems; means for normally retaining said handle in a neutral position; said handle having one end forked and the other end provided with a portion for manual engagement; a reciprocating member having a rib and a tappet movable respectively adjacent the slide and the forked end of the handle, the rib being in position to prevent movement of the slide when the tappet is in a position other than between the branches of the forked end of the handle; with means for moving the slide at will.

10. The combination of a valve; a handle for manually operating the same; a movable member; means for adjusting the handle into a position to cause it to be automatically actuated by the movable member; with a latch for temporarily holding the handle in a position corresponding to the open position of the valve.

11. The combination of two valves; a manually operable handle for actuating said valves; a reciprocable member; means for moving said handle into a position to cause it to be automatically actuated by said reciprocable member; and a latch for holding said handle in a predetermined position with one of the valves open.

12. The combination of a valve; a supporting structure having stops; a member adjustably mounted on the supporting structure; a handle for operating the valve mounted on said member and placed to have its movement limited by the stops; with means for adjusting the member to vary the position of the handle relatively to the stops.

13. The combination of a valve having an operating rod; a supporting structure; a handle pivoted thereto and operative on the rod, said handle having portions of different widths; stops for limiting the angular movement of the handle; and means for adjusting the slide to bring portions of the handle of different widths between the stops to vary the possible angular movement of said handle.

In testimony whereof, I have signed my name to this specification, in the presence of two subscribing witnesses.

JOHN WILSON BROWN, Jr.

Witnesses:
WILLIAM E. BRADLEY,
WM. A. BARR.

Copies of this patent may be obtained for five cents each, by addressing the "Commissioner of Patents, Washington, D. C."